(12) United States Patent
Wagner et al.

(10) Patent No.: US 10,249,060 B2
(45) Date of Patent: Apr. 2, 2019

(54) TOOL EROSION DETECTING SYSTEM USING AUGMENTED REALITY

(71) Applicant: Caterpillar Inc., Peoria, IL (US)

(72) Inventors: James Edward Wagner, Chillicothe, IL (US); Patrick Simon Campomanes, Washington, IL (US); Brian Charles Brown, Woodhull, IL (US); Drew Steven Solorio, Elmwood, IL (US); John M. Plouzek, Peoria, IL (US); David Jason Mcintyre, Chillicothe, IL (US); Paul Davis Jackson, Jr., Peoria, IL (US); Phillip John Kunz, Morton, IL (US); Thomas Marshall Congdon, Dunlap, IL (US); Shadi Naji Kfouf, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 63 days.

(21) Appl. No.: 15/378,965

(22) Filed: Dec. 14, 2016

(65) Prior Publication Data
US 2018/0165884 A1    Jun. 14, 2018

(51) Int. Cl.
*E02F 9/26* (2006.01)
*H04N 7/18* (2006.01)
(Continued)

(52) U.S. Cl.
CPC ............... *G06T 11/00* (2013.01); *E02F 9/26* (2013.01); *H04N 5/23293* (2013.01); *H04N 7/183* (2013.01); *G06F 3/04842* (2013.01)

(58) Field of Classification Search
CPC .......................... G06T 19/006; G06K 9/00671
See application file for complete search history.

(56) References Cited

U.S. PATENT DOCUMENTS

| 8,918,246 B2 | 12/2014 | Friend |
| 9,243,381 B2 | 1/2016 | Behmlander et al. |

(Continued)

FOREIGN PATENT DOCUMENTS

| KR | 1020150046693 | 4/2015 |
| KR | 101563722 | 10/2015 |

OTHER PUBLICATIONS

Wang, Xiangyu, Phillip S. Dunston, and M. Skiniewski. "Mixed Reality technology applications in construction equipment operator training." Proceedings of the 21st International Symposium on Automation and Robotics in Construction (ISARC 2004). 2004.*

(Continued)

*Primary Examiner* — Daniel F Hajnik
(74) *Attorney, Agent, or Firm* — Finnegan, Henderson, Farabow, Garrett & Dunner, LLP (57) ABSTRACT

A tool erosion detecting system for a machine having a ground engaging tool is disclosed. The tool erosion detecting system may include a camera configured to generate a first image of the ground engaging tool on a display device, an input device configured to receive a user input, and a controller in communication with the camera and the input device. The controller may be configured to generate an augmented reality view of the ground engaging tool. The augmented reality view may include the first image of the ground engaging tool generated by the camera and a second image of a ground engaging tool superimposed on the first image and being associated with a selected wear level, wherein the selected wear level is based on the user input.

19 Claims, 8 Drawing Sheets

(51) Int. Cl.
    *G06T 11/00*     (2006.01)
    *H04N 5/232*     (2006.01)
    *G06F 3/0484*     (2013.01)

(56) References Cited

U.S. PATENT DOCUMENTS

| | | |
|---|---|---|
| 2002/0133264 A1 | 9/2002 | Maiteh et al. |
| 2012/0075343 A1* | 3/2012 | Chen .................. G09G 5/397 345/633 |
| 2012/0306916 A1* | 12/2012 | Marumoto .......... G01B 11/24 345/632 |
| 2013/0114878 A1 | 5/2013 | Scheid et al. |
| 2014/0184643 A1 | 7/2014 | Friend |
| 2014/0188333 A1 | 7/2014 | Friend |
| 2015/0149049 A1 | 5/2015 | Bewley et al. |
| 2015/0339810 A1 | 11/2015 | Lim et al. |
| 2017/0067229 A1* | 3/2017 | Stock ................... E02F 9/2054 |
| 2017/0352199 A1* | 12/2017 | Finley .................. E02F 9/2808 |

OTHER PUBLICATIONS

"Motion Metrics: Missing Shovel Teeth Detection—Product Review", by Vivien Hui, published May 27, 2014 ; available at: http://miningenginerd.com/?p=347 (Year: 2014).*

* cited by examiner

TOOL EROSION DETECTING SYSTEM USING AUGMENTED REALITY

TECHNICAL FIELD

The present disclosure relates generally to a tool erosion detecting system and, more particularly, to a tool erosion detecting system using augmented reality.

BACKGROUND

Mobile machines, such as excavators, wheeled and tracked loaders, mining shovels, backhoe loaders, and/or other machines have tool systems that include a linkage system driven by hydraulic actuators and a work tool connected to the linkage system. Some work tools, such as buckets, include a plurality of "tips" attached to an edge of the bucket for breaking through various types of materials, such as soil, rock, aggregate piles, demolition debris, and/or other types of materials. Different types of tips are often designed and employed for performing particular tasks or for breaking through particular types of material. Over time, the tips of a work tool can wear down as a result of their use, which can cause the tips to become dull, shorter in length, and develop more rounded features. Worn tips are typically replaced on a periodic basis or as needed, depending on wear rate and task requirements.

In some situations, it can be challenging for operators or on-site maintenance personnel to determine the optimum time to replace the tips of a work tool. While it is desirable to change the tips often enough to prevent damage to the tip mounting system and to other parts of the work tool, it is also economically advantageous to utilize the full useful life of a set of tips before replacing them. However, determining precisely when to replace tool tips can be difficult for operators that are in the field or are away from maintenance facilities, since not all operators may be familiar with the wear characteristics of tool tips. Additionally, it can be difficult to become familiar with several different types of tool tips that may each have different wear characteristics.

One method of detecting a broken or worn tooth attached to a work tool is discussed in U.S. Patent Application Publication No. 2015/0339810 A1 of Lim et al. (the '810 publication) that published on Nov. 26, 2015. The method of the '810 publication includes detecting a broken or worn tooth by capturing successive images of the tooth. A current tool image is received and analyzed to determine feature characteristics of the tooth. When certain feature characteristics are detected, the current image is compared to a plurality of previously analyzed images of the tooth. The previously analyzed images of the tooth are each associated with a predetermined wear level. If the current image is sufficiently similar to a previously analyzed image, the tooth is determined to be at the wear level associated with the previously analyzed image and an alert is generated if the tooth is sufficiently worn.

While the system of the '810 publication may associate detected tooth features with previously determined wear levels, it may not be optimum. For example, the alarm generated using the method of the '810 publication may not convey wear information to an operator with sufficient time to plan for the possibility of changing a tooth prior to critical wearing. Further, using the method of the '810 publication may not be efficient or convenient for users that engage multiple machines on a regular basis and require an expedient analysis tool.

The disclosed tool erosion detecting system is directed to overcoming one or more of the problems set forth above and/or other problems of the prior art.

SUMMARY

In one aspect, the present disclosure is directed to a tool erosion detecting system for a machine having a ground engaging tool. The tool erosion detecting system may include a camera configured to generate a first image of the ground engaging tool on a display device, an input device configured to receive a user input, and a controller in communication with the camera and the input device. The controller may be configured to generate an augmented reality view of the ground engaging tool. The augmented reality view may include the first image of the ground engaging tool generated by the camera and a second image of a ground engaging tool superimposed on the first image and being associated with a selected wear level, wherein the selected wear level is based on the user input.

In another aspect, the present disclosure is directed to a method of detecting tool erosion on a machine having a ground engaging tool. The method may include generating a first image of the ground engaging tool, receiving a user input via an input device, and generating an augmented reality view of the ground engaging tool on a display device. The augmented reality view may include the first image of the ground engaging tool. The method may further include superimposing a second image of a ground engaging tool on the first image of the ground engaging tool, the superimposed second image being associated with a selected wear level, wherein the selected wear level is based on the user input.

In yet another aspect, the present disclosure is directed to a tool erosion detecting system for a machine having a ground engaging tool. The tool erosion detecting system may include a camera configured to generate a first image of the ground engaging tool on a display device, an input device configured to receive user input, and a controller in communication with the camera and the input device. The controller may be configured to generate an augmented reality view of the ground engaging tool. The augmented reality view may include the first image of the ground engaging tool generated by the camera, the first image including one of a live video image and a captured still image of the ground engaging tool. The augmented reality view may also include a second image of a ground engaging tool superimposed on the first image and being associated with a selected wear level. The selected wear level may be based on the user input, and the second image may include one of a graphical single-side view of a ground engaging tool and a graphical perspective view of a ground engaging tool. The controller may be further configured to generate a wear level indicator on the display device, the wear level indicator being indicative of the selected wear level.

DETAILED DESCRIPTION

Figure 1:
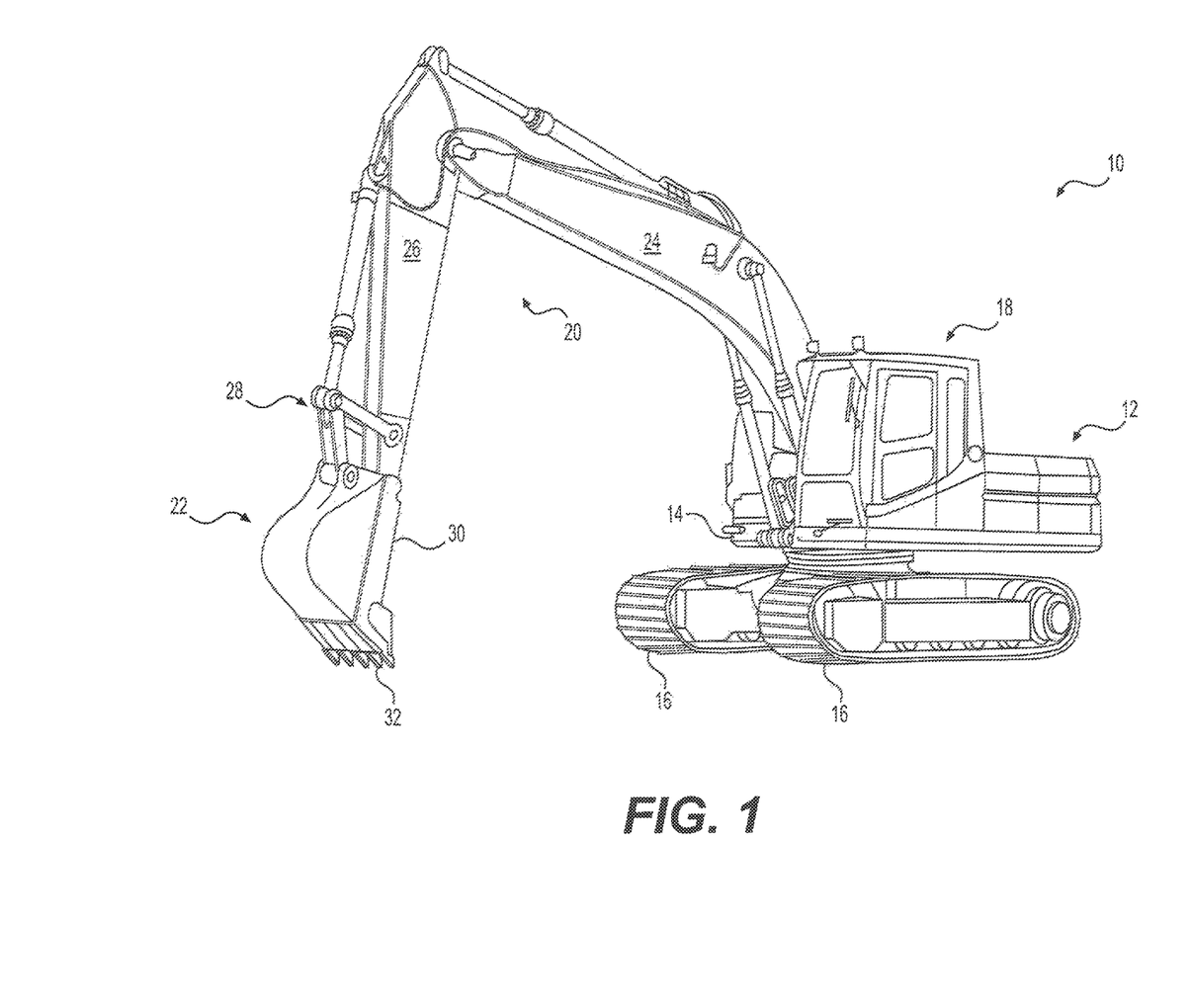
FIG. 1 is a perspective view of an exemplary disclosed machine.

An exemplary embodiment of a machine 10 is illustrated in FIG. 1. The machine 10 may be, for example, an excavator, a wheeled or tracked loader, a mining shovel, a backhoe loader, or any other type of machine known in the art. As an excavator, the machine 10 may include a power source 12 (e.g., an engine, a motor, a battery bank, etc.) mounted to a frame 14 and configured to drive one or more traction device 16 for propelling the machine 10 across a worksite. The traction devices 16 may be mounted or movably coupled to the frame 14 and may include, for example, tracks, wheels, and/or combinations thereof. The frame 14 may also support an operator station 18 configured to house, for an example, an operator's seat and one or more machine control devices for controlling various functions of the machine 10.

As an excavator, the machine 10 may also include a linkage system 20 and a work tool 22 connected to the linkage system 20. The linkage system 20 may include a boom 24 pivotally connected to the frame 14, a stick 26 pivotally connected to the boom 24, and linkage 28 pivotally connecting the work tool 22 and the stick 26. The work tool 22 may include a bucket 30 pivotally connected to the linkage 28 and a plurality of ground engaging tool assemblies 32 connected to the bucket 30.

Figure 2:
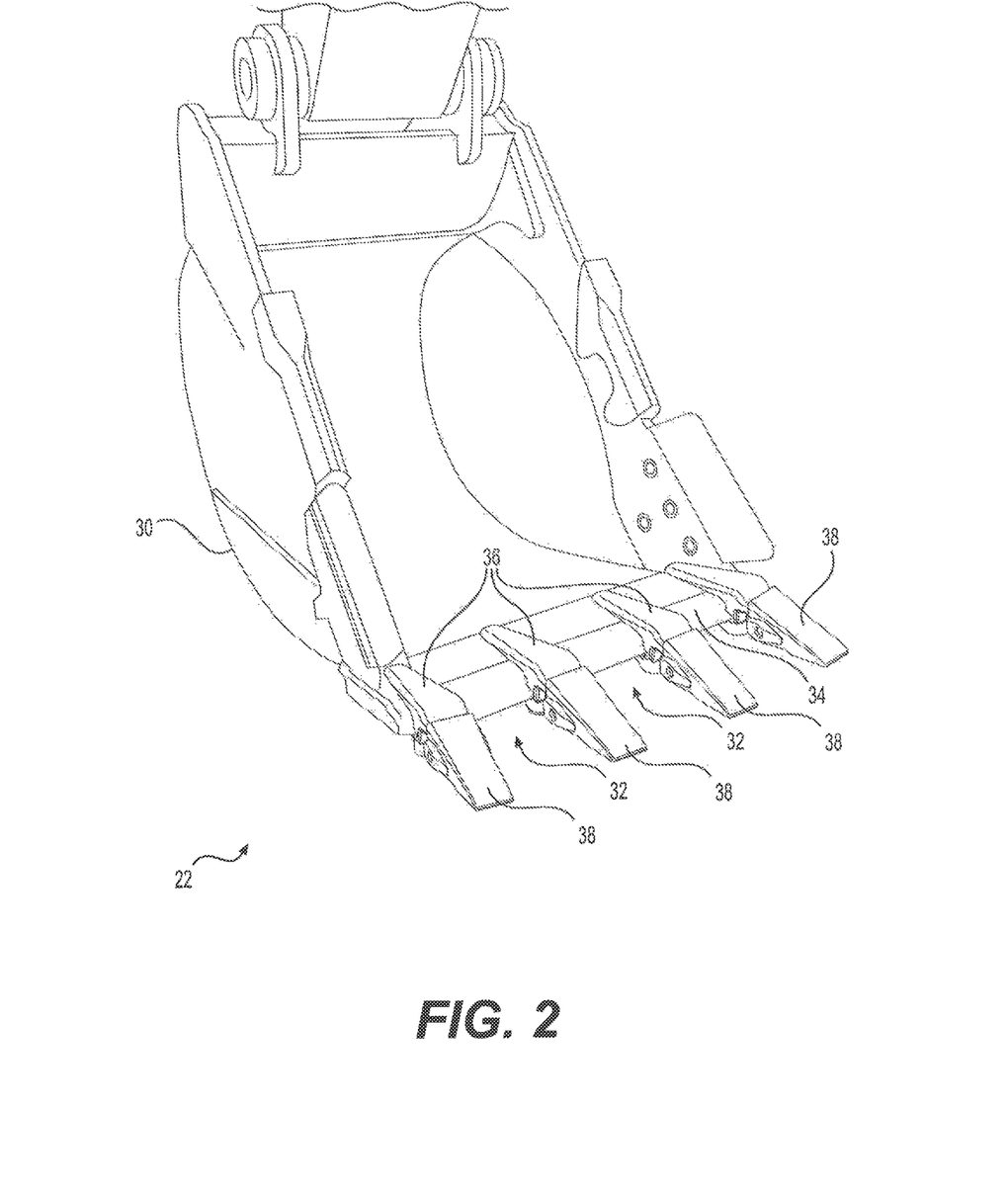
FIG. 2 is a perspective view of an exemplary disclosed work tool that may be used with the machine of FIG. 1.

As shown in FIG. 2, a plurality of ground engaging tool assemblies 32 may be connected to a base edge 34 of the bucket 30. Each ground engaging tool assembly 32 may include an adapter 36 configured to engage the base edge 34 of the bucket 30. Each ground engaging tool assembly 32 may also include a ground engaging tip 38 removably attached to the adapter 36 as a ground engaging tool. The tip 38 endures the majority of the impact and abrasion caused by engagement with work material and wears down more quickly and breaks more frequently than the adapter 36. Consequently, multiple tips 38 may be worn down and replaced over a period of time.

In many instances, the tips 38 wear down or erode over a period of use, thereby necessitating periodic replacement. Tip replacement can occur on a regular basis, such as during regularly scheduled maintenance, or after a certain period of time, such as weekly, monthly, quarterly, annually, etc. To ensure the full useful life of the tips 38 are utilized, thereby maximizing the economic value of each tip, machine operators, owners, servicemen, or dealers may wish to periodically observe the amount of erosion sustained or "wear level" of the tips 38 and replace each tip or groups of the tips 38 as needed (e.g., only once a certain wear level or erosion threshold has been reached). Because there are many different types of the tips 38 available (e.g., bucket tips, penetration tips, abrasion tips, etc.) having different configurations (e.g., general purpose, sharp, spiked, etc.) and different dimensions and duty levels, it may be difficult for personnel to quickly identify the wear level of one of the tips 38 for purposes of determining when to replace a tip 38.

Figure 3:
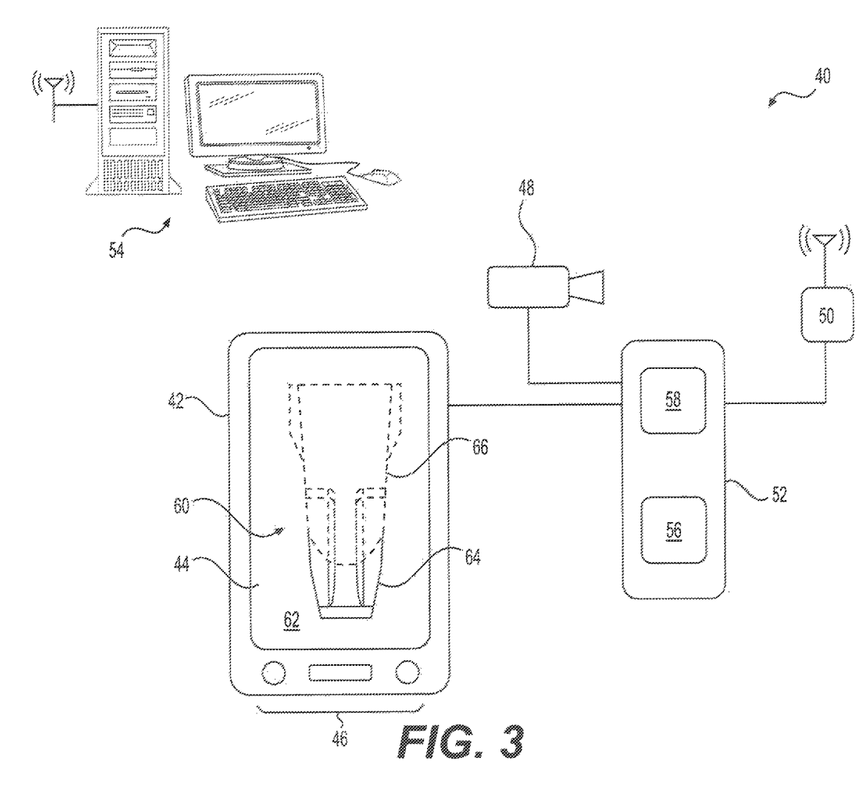
FIG. 3 is a schematic illustration of an exemplary disclosed tool erosion detecting system.

FIG. 3 shows an exemplary tool erosion determination system ("system") 40 that may be used to quickly and easily determine the wear level of a tip 38. The system 40 may include an erosion determination device ("device") 42 that includes a display device 44, one or more input devices 46, a camera 48, a communication device 50, and a controller 52 connected to the other components of the device 42. The device 42 may include a portable electronic computational device, such as a smartphone, a tablet, a personal digital assistant (PDA), a laptop computer, a dedicated electronic device, or another type of device configured to perform computer functions. In other embodiments, the device 42 may be a stationary device, such as a desktop computer, back office computer, server, etc.

The display device 44 may be or include an LED display, LCD display, CRT display, or other type of display device configured to receive signals and/or show information associated with the signals. For example, the display device 44 may be the built-in display of a smartphone, tablet, PDA, laptop computer, etc. The input devices 46 may include one or more interface devices configured to allow a user to provide input for interacting with and/or controlling functions of the device 42 or its components. For example, the input devices 46 may include one or more buttons, touch pads, switches, dials, or multifunctional displays. In some embodiments, the display device 44 may be a multifunctional display, such as a touch screen device, configured to receive user inputs via contact with another object, such as a stylus or a user's finger.

The camera 48 may be configured to capture video image data and/or still image data for display on the display device 44. In some embodiments, the camera 48 may be a built-in camera of the device 42, such as the camera of a smartphone, tablet, laptop computer, PDA, etc. In other embodiments, the camera 48 may be a separate device connectable to the controller 52 via a data connection, such as a wireless connection (e.g., a cellular network, IEEE 802.15.1, IEEE 802.11, or another type of wireless communication standard) or a wired connection. The camera 48 may be configured to be used in conjunction with the display device 44 and the controller 52, for example, to enable a user to view real time or "live" image data on the display device 44. The camera 48 may also include additional hardware and/or software needed to enable the camera 48 to be used to capture video and/or sill image data.

The communication device 50 may be configured to communicate electronic data (e.g., computer-readable data) via a wireless protocol (e.g., a cellular network, IEEE 802.15.1, IEEE 802.11, or another type of wireless communication standard) or wired connection. The communication device 50 may be a separate device or may be included as part of the controller 52 (e.g., a built-in communication device). The communication device 50 may be configured to communicate (e.g., exchange electronic computer-readable data) with other devices, such as an off-board computer 54, via a communication network (e.g., a cellular network, the Internet, a local area network (LAN), a wide area network (WAN), etc.).

The controller 52 may be in communication with the other components of the system 40 and configured to receive inputs and generate outputs. As used herein, the term "controller" (e.g., with reference to the controller 52 and/or other controllers described herein) may refer to a computing device (e.g., a computer) having a single microprocessor or multiple microprocessors, computer memory (e.g., nontransitory computer-readable medium), and/or other components configured to receive inputs from other components of the system 40 and generate output signals based on the inputs. For example, the controller 52 may include a memory 56, a secondary storage device, a clock, and a processor 58 and/or other processing hardware for accomplishing tasks consistent with the present disclosure. Numerous commercially available microprocessors can be configured to perform the functions of controllers described herein. It should be appreciated that controllers described herein could readily embody a general machine controller (e.g., an electronic control unit (ECU), central processing unit (CPU), etc.) capable of controlling numerous other machine functions. Various other known circuits may be associated with controllers described herein, including signal-conditioning circuitry, communication circuitry, and other appropriate circuitry.

Figure 4:
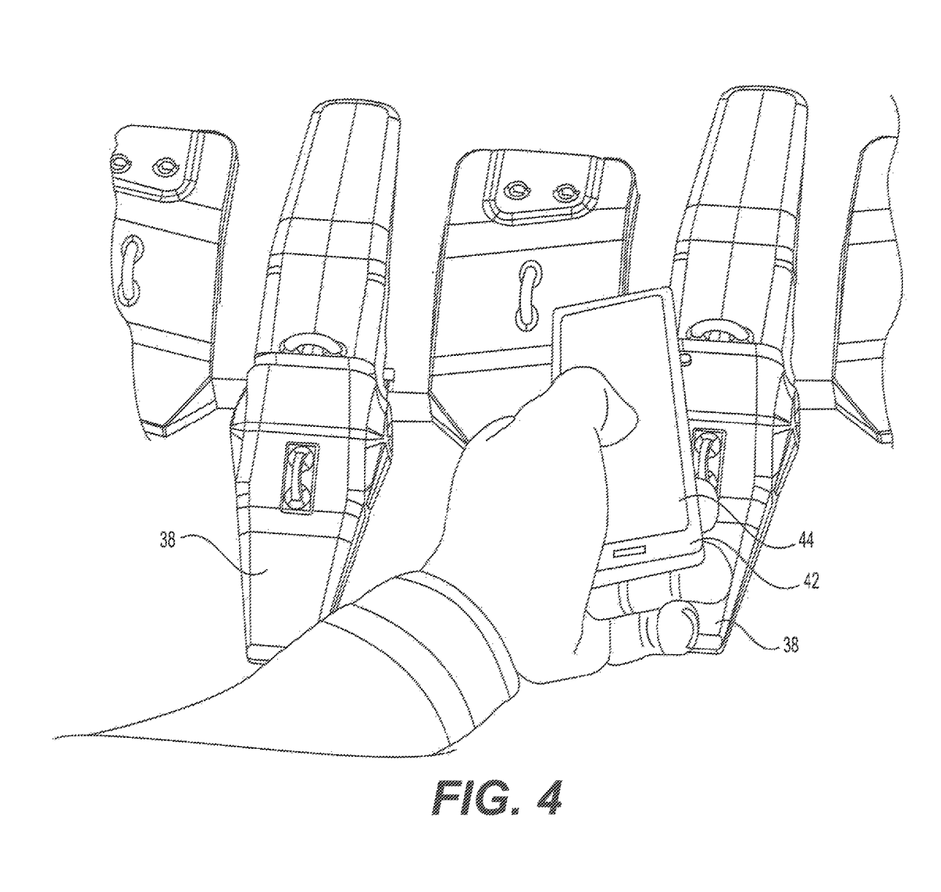
FIG. 4 is a pictorial illustration of an exemplary tool erosion detecting device that may be used to determine the erosion of a ground engaging tool.

The system 40 may be configured to allow users to compare video or still image data of a ground engaging tip 38 to a graphical image of a ground engaging tip (e.g., a new or worn tip) using augmented reality. That is, the system 40 may allow users to compare a computer-generated graphical image of a ground engaging tip to an actual ground engaging tip 38 attached to or associated with the machine 10 for purposes of quickly determining the wear level of the tip 38. For example, FIG. 4 shows one aspect of how the device 42 may be used to gather image data (e.g., via the camera 48 attached to the device 42—the camera 48 not shown in FIG. 4). In some embodiments, a user may direct the device 42 at the tip 38 such that the camera 48 is able to receive image data of the tip 38 to be displayed to the user on the display device 44. As explained below, the system 40 may be configured to generate an augmented reality view of the tip 38 enabling a user to determine the wear level of the tip 38 and/or to perform other tasks or functions.

Figure 5:
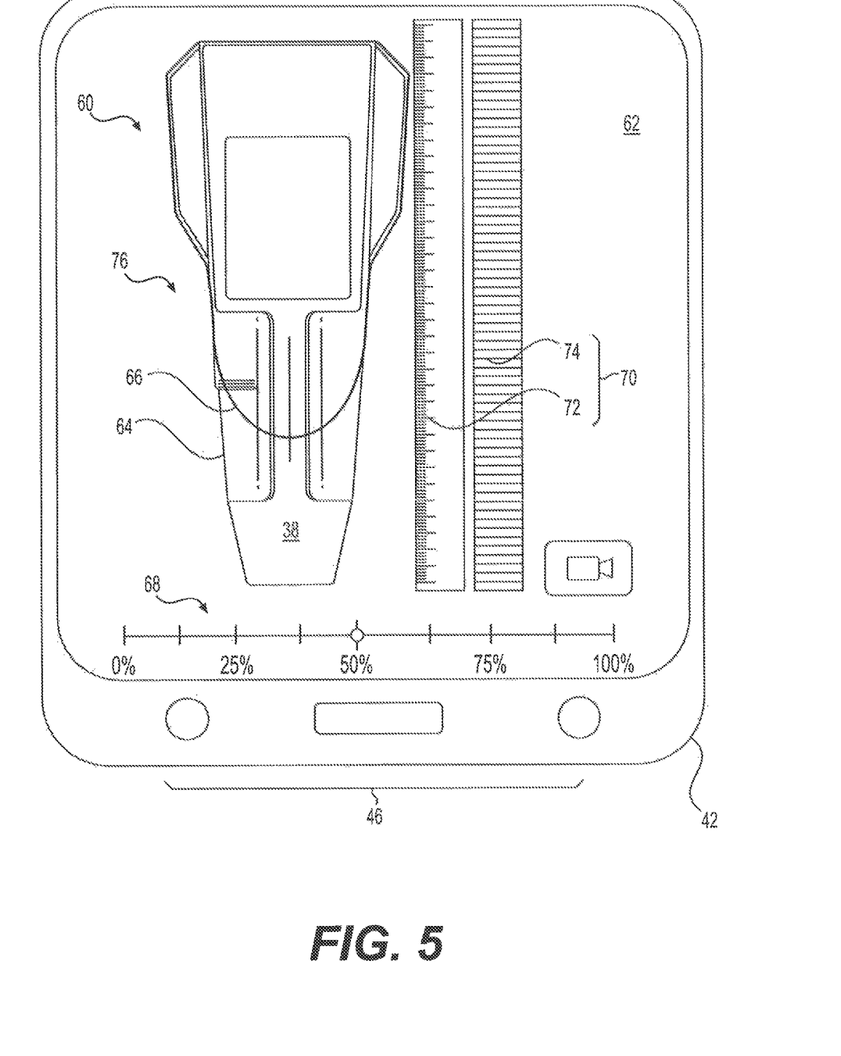
FIG. 5 is a pictorial illustration of a graphical user interface that may be generated by the tool erosion detecting system of FIG. 3.

FIG. 5 shows an exemplary an augmented reality view 60 of the ground engaging tip 38 as a ground engaging tool. The augmented reality view 60 may be a graphical image generated by the controller 52 that embodies a view of the tip 38 in augmented reality. For example, the controller 52 may be configured to generate a graphical user interface (GUI) 62 that includes the augmented reality view 60. The augmented reality view 60 may include a first image 64 of the tip 38 (and/or other space or objects observed via the camera 48) generated by the camera 48. In some embodiments, the first image 64 of the tip 38 may be a live video image of the tip 38, as perceived and generated by the camera 48 (e.g., when the camera 48 is a video camera and/or includes video functionality). That is, the first image 64 may be an image generated on the display device 44 of a live video stream captured via the camera 48. In other embodiments, the first image 64 may be a still image (e.g., a "picture") of tip 38 generated via the camera 48.

The augmented reality view 60 may also include a second image 66 superimposed over the first image 64. The second image 66 may be a graphical image (e.g., a graphical depiction or rendering) of a ground engaging tool (e.g., a ground engaging tip). For example, the controller 52 may be configured to generate a graphical image of a ground engaging tip (e.g., using image data stored in the memory 56) on the display device 44. The second image 66 may be still with respect to the GUI 62 and/or the display device 44, or may be selectively movable within the GUI 62 and/or on the display device 44 in response to input signals received via the input devices 46. The first and second images 64 and 66 may become aligned by moving the camera 48 (or the device 42 attached thereto) or by selectively moving the second image 66 in the manner explained above. In this way, the first and second images 64 and 66 may be aligned while the second image 66 is superimposed over the first image 64.

The second image 66 may be associated with a selected wear level (e.g., a wear level corresponding to a wear level of tip 38). For example, the controller 52 may be configured to generate the second image 66 based on data corresponding to or characterizing a ground engagement tip (such as tip 38) that has been worn to a certain degree (e.g., a percentage of sustainable wear, an erosion distance, etc.). In this way, the system 40 may enable a user to quickly visualize and compare the first image 64 (i.e., an image of the tip 38) to a graphical representation of the tip 38 that has been worn to a known degree. This may allow a user to obtain a fast and accurate understanding the wear level of the tip 38

The selected wear level of the second image 66 may be based on user input received via the input device 46. For example, the controller 52 may be configured to receive user inputs via the input device 46 and associate the inputs with a user selection of the wear level of second image 66. For example, when the input device 46 includes one or more buttons or other interface devices, the controller 52 may be configured to interpret certain user actuations of the buttons or other interface devices as being indicative of a selection of a certain wear level of the second image 66. The controller 52 may then generate the second image 66 based on the selected wear level. That is, the controller 52 may be configured to generate the second image 66 such that the second image 66 represents an image of a ground engaging tip associated with the selected wear level.

In some embodiments, the controller 52 may be configured to generate a wear level indicator 68 on the display device 44. The wear level indictor 68 may be a graphical object indicative of the selected wear level (i.e., the wear level of the second image 66 selected by the user). For example, the wear level indicator 68 may be a graphical object configured to convey the selected wear level in a visual manner. In the example of FIG. 5, the wear level indicator 68 is a sliding indicator (e.g., a circle, a dot, a bar, etc.) configured to be positioned at or over the wear level selected by the user. In other embodiments, wear level indicator may embody a different shape or image, such as a graphical dial, text box, progressive bars, etc. As used herein, the term "wear level" may refer to an indication of the extent to which the tip 38 is worn or eroded. For example, the wear level of tip 38 may refer to a percent or an amount (e.g., a length) of remaining usable material. For instance, in the example of FIG. 5, the wear level indicator 68 is indicative of a percent of remaining usable (i.e., non-worn) material of the tip 38. In other embodiments, the wear level indictor 68 may be indicative of, for example, a percent or amount of material that has worn away from the tip 38.

Figure 6:
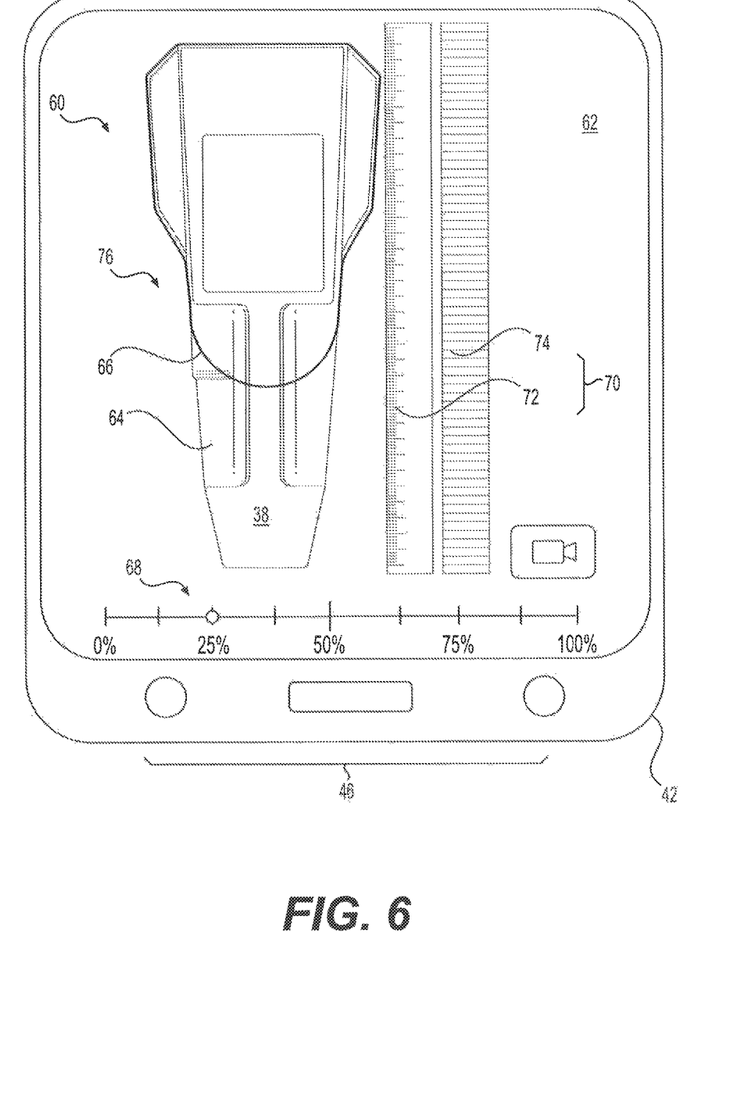
FIG. 6 is another pictorial illustration of a graphical user interface that may be generated by the tool erosion detecting system of FIG. 3.

In some embodiments, the wear level indicator 68 may be selectively movable by the user via the input device 46, for example, as a means by which the user is able to provide input indicative of the selected wear level. That is, the device 42 may be configured to allow the user to slide the wear level indicator 68 to a desired wear level to indicate the selected wear level of the second image 66. For example, in response to a user input received via the input device 46 (e.g., when a user slides a finger across wear level indicator 68), the controller 52 may be configured to reposition the wear level indicator 68. In the example of FIG. 5, the wear level indicator 68 was moved to the 50% wear level (e.g., 50% remaining, 50% worn away, etc.). In the example of FIG. 6, the wear level indicator 68 has been moved to the 25% wear level (e.g., 25% remaining, 25% worn away, etc.). Thus, the second image 66 in FIG. 6, as compared to second image 66 in FIG. 5, may indicate or depict an additional 25% of wear. In this way, the user may be able to move the wear level indicator 68 until the second image 66 matches or otherwise resembles the first image 64. When the first and second image 64 and 66 are "matched" by the user, the user may observe the wear level of the tip 38 via the wear level indicator 68.

The controller 52 may also be configured to generate a scale 70 on the display device 44 indicative of a physical dimension of the tip 38, which may enable users to readily associate the wear level of the tip 38 with a corresponding physical dimension. The scale 70 may be a graphical object representative of a measurement scale (e.g., a length scale) or a comparative scale (e.g., a unit-less scale). For example, in some embodiments, the scale 70 may include a ruler 72 positioned near the first and second images 64 and 66. The ruler 72 may be indicative of any suitable unit (e.g., inches, centimeters, etc.). In other embodiments, the scale 70 may also or alternatively include a comparative scale 74 configured to enable automatic dimensional analyses of the tip 38, for example, by the controller 52 or off-board computer 54. For example, the comparative scale 74 may include a set of evenly spaced bars or other features that may be associated with known or determined spacing and/or other physical relationship that may be indicative of a physical measurement (e.g., a length) that can be associated with the first and/or second images 64 and 66.

For example, the system 40 may be configured to store image data associated with the augmented reality view 60, which may be used for subsequent analysis of the tip 38. For example, the controller 52 may be configured to receive input from a user (e.g., via the input device 46) indicative of a request to record image data (e.g., video and/or still images) and store (e.g., in the memory 56) the image data for further analysis. The image data may include data representing the first and second images 64 and 66, the selected wear level, the scale 70, and/or other information (e.g., the type of tip 38, user information, machine information, location information, time and date information, etc.). In some embodiments, the controller 52 may be further configured to transmit the image data associated with the augmented reality view 60 to other devices via the communication device 50. For example, the controller 52 may be configured to transmit the image data to the off-board computer 54 or another electronic device (e.g., a smartphone, a tablet, a PDA, laptop or desktop computer, a server, etc.) for further processing (e.g., dimensional analysis, statistical collection and analysis, wear or failure mode analysis, etc.). Alternatively, the controller 52 may be configured to conduct such further analysis of the image data, for example, in conjunction with the memory 56 and/or processor 58.

Figure 7:
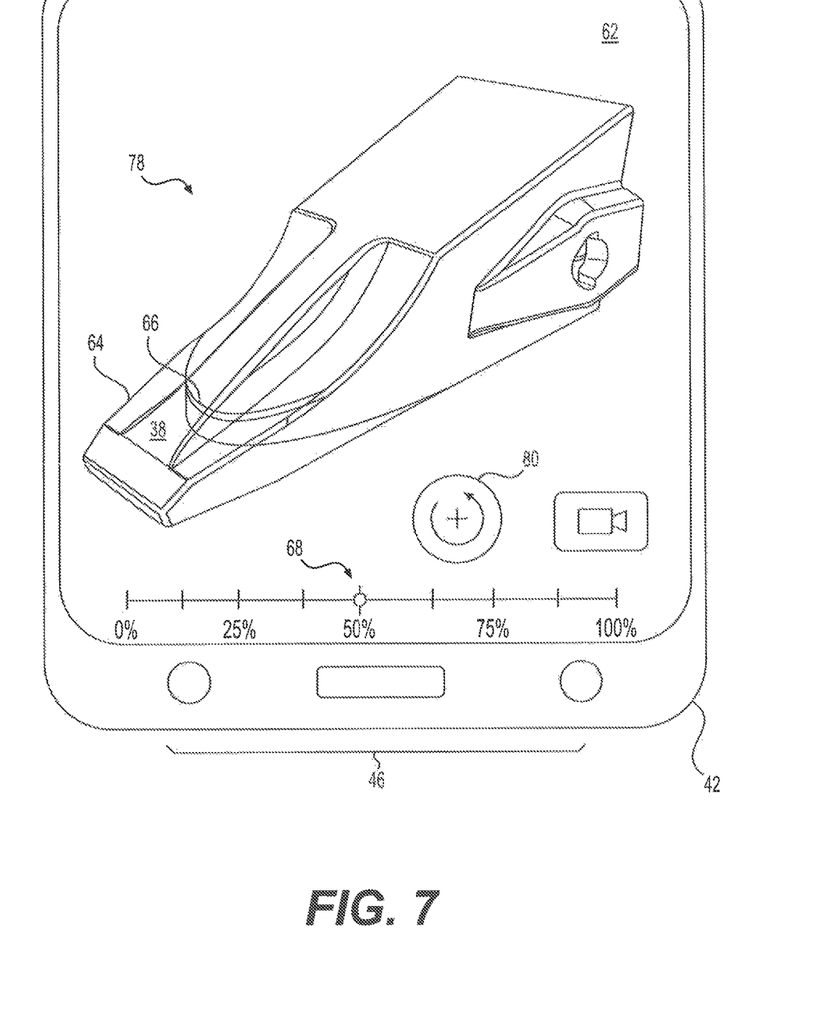
FIG. 7 is another pictorial illustration of a graphical user interface that may be generated by the tool erosion detecting system of FIG. 3.

As shown in the examples of FIG. 5 and FIG. 6, the second image 66 may include a graphical single-side view 76 (e.g., a top view) of a ground engaging tool (e.g., tip 38). As used herein, the term "side" (e.g., when referring to a "single-side" view) may refer to any singular side of an object or image, such as a top side, a lateral side (e.g., left or right side), a front or rear side, or a bottom side. In the examples of FIGS. 5 and 6, a user may be able to position the camera 48 (or the device 42) above the tip 38 to ensure a top-view image (i.e., the first image 64) of the tip 38 is collected with which the second image 66 (as the single-side view 76) may be appropriately compared. In other embodiments, as shown in FIG. 7, the controller 52 may be configured to enable the user to position the camera 48 (or the device 42) at an angle with respect to one or more surfaces of the tip 38 to generate a perspective view 78 of a ground engaging tool (e.g., tip 38). For example, the controller 52 may be configured to generate the second image 66 such that the second image 66 (as the perspective view 78) appears geometrically similar to the first image 64 of the tip 38. In this way, users may be enabled to detect the wear level of the tip 38 from a convenient position, such as at an angle with respect to the tip 38 while ensuring accurate results.

In some embodiments, the controller 52 may be configured to receive user input indicative of a command to adjust an orientation (e.g., a perceived spatial or geometric orientation) of the second image 66 to enable the second image 66 to be properly matched with the first image 64. For example, the controller 52 may be configured to receive input via the input device 46 and interpret the input as being indicative of a desire to manipulate (e.g., rotate on one or more axes) the second image 66. In some embodiments, as shown in FIG. 7, the controller 52 may be configured to generate an orientation control object 80 on the display device 44, for use in manipulating or adjusting the orientation of the second image 66. The orientation control object 80 may be a graphical object configured to be engaged by the user via the input device 46 (e.g., when the display device 44 is a multi-functional display device) and usable to rotate the second image 66 as desired to facilitate matching the first image 64 with second image.

INDUSTRIAL APPLICABILITY

The disclosed tool erosion detecting system finds potential application in any situation where it is desirable to quickly understand the extent to which a ground engaging tool attached to a work tool or mobile machine tool is worn. The disclosed tool erosion detecting system finds particular applicability in on-site, dealership, and service center applications in which a user may wish to quickly understand the extent to which a ground engagement tool is worn, for example, when determining whether to replace a worn tool with a new tool. One skilled in the art will recognize, however, that the disclosed tool erosion detecting system could be utilized in relation to other machine components subject to wearing and erosion that may or may not be associated with a work tool or ground engaging tool. A method of detecting tool erosion on a machine having a ground engaging tool will now be explained with reference to FIG. 8 and process 800.

During operation of the machine 10, the tips 38 may eventually erode or wear down as a result of impacts and abrasion sustained from cutting through or otherwise engaging with work material. Operators or other personnel may periodically replace the tips 38, but may wish to replace the tips 38 only when the tips 38 have reached or nearly reached their full useful life. However, it can be difficult to visually determine to what extent the tips 38 have eroded (i.e., the wear level of the tips 38). To help users quickly and easily determine the wear level of the tips 38, the system 40 may be used, for example, in conjunction with the device 42, to allow the user to compare a real tip 38 to a graphical image of the same type of tip at a known wear level.

For example, the user may initiate the system 40, for example, by opening a computer application or initiating another type of executable computer process (computer-readable instructions for which may be stored in the memory 56 of the device 42). The user may then be prompted to select a type of the tip 38, for example, from a tabular list, a dropdown menu, a pictorial list, or another collection of types of the tip 38. Selections of the tip 38 may also or alternatively be made in conjunction with a type of machine, a type of work tool, or other information. Lists of tip types may be stored in the memory 56 and accessed by the processor 58 or other component of the controller 52, or may alternatively be accessed via a network (e.g., the internet) when such information is stored on a different device.

Figure 8:
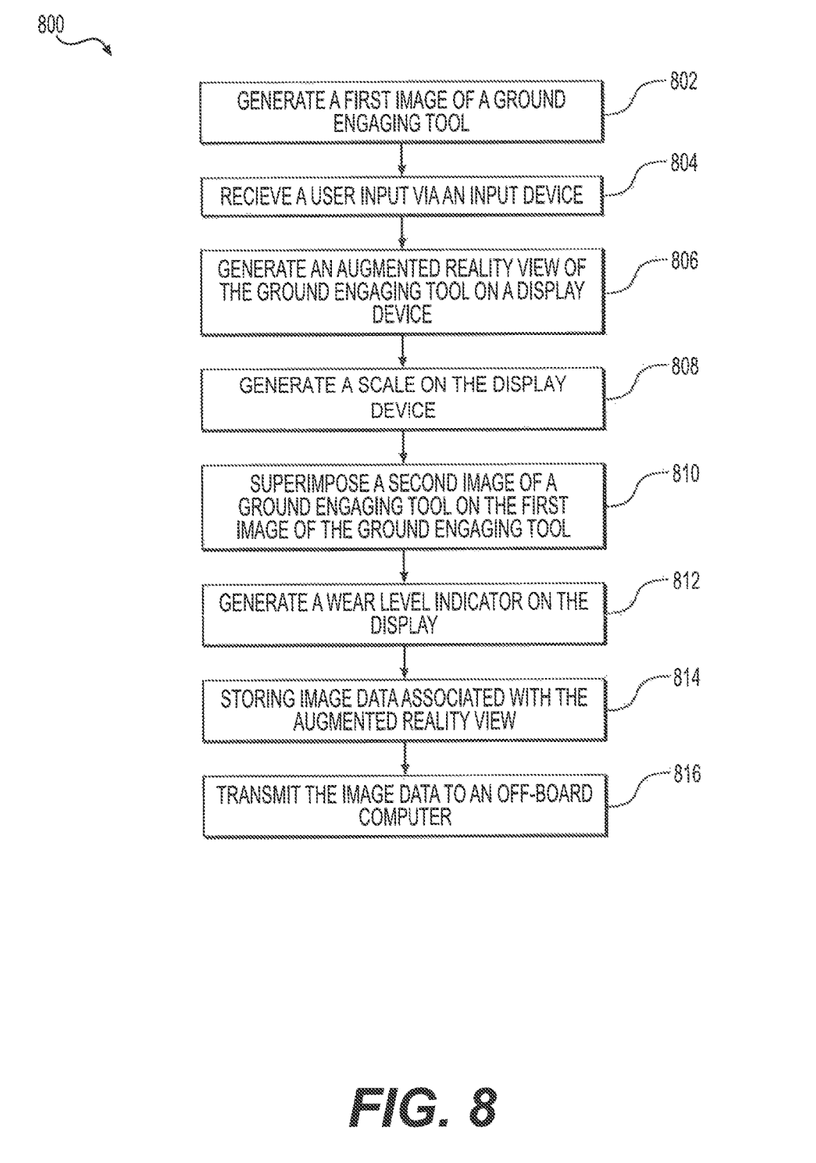
FIG. 8 is block diagram showing an exemplary method of detecting tool erosion of a ground engaging tool.

Upon selection of a type of tip 38, the user may then position the camera 48 (or the device 42 connected thereto), and the controller 52 may generate a first image of a ground engaging tool (e.g., tip 38) (Block 802). The first image may include a single-side view or perspective view of the tip 38, generated as the first image 64. The controller 52 may then, in any order operation, receive a user input via an input device (Block 804), the input being indicative of a wear level, and generate the augmented reality view 60 of the ground engaging tool (e.g., tip 38) on display device 44 (Block 806). The augmented reality view 60 may include the second image 66 and the first image 64. The second image 66 may be a single-side view 76 or perspective view 78 of a graphical representation of a ground engaging tip (e.g., the selected type of ground engaging tip) associated with a selected wear level. In some embodiments, the controller 52 may also generate the scale 70 (e.g., a ruler 72) on the display device 44 (Block 808), thereby enabling the user to quickly and easily understand the extent to which tip 38 has been worn.

The controller 52 may superimpose the second image 66 on the first image 64 (Block 810), thereby enabling the user to quickly compare the tip 38 to an image of the same type of tip at a certain wear level. The controller 52 may generate a wear level indicator (Block 812), such as wear level indicator 68 to allow the user to select a wear level to be associated with second image 66 for comparison to the first image 64. The user may then select the wear level associated with the second image 66 by providing input via the input device 46 an/or in conjunction with the wear level indicator 68 (e.g., when wear level indicator is configured to be movable or adjustable). For example, the user may slide the wear level indicator 68 to the left and right, thereby decreasing and increasing the size (and hence the perceived wear level) of the second image 66 until the first and second images 64 and 66 are sufficiently similar. The wear level indicator 68 will then accurately indicate the wear level of the tip 38.

When the controller 52 generates the second image 66, the user may align the second image 66 with the first image 64 by moving (i.e., orienting) the camera 48 until the first and second images 64 and 66 are sufficiently aligned. When the controller 52 generates the perspective view 78 of the second image 66, the user may also align the perspective view 78 with the first image 64 by adjusting the orientation of the second image 66 via the input device 46 and/or in conjunction with the orientation control object 80. When the first and second images 64 and 66 are properly aligned, the user may reference the scale 70 as an indication of the physical length of the tip 38 and/or as an indication of an amount (e.g., a length) of material that has eroded from the tip 38.

The user may then provide input (e.g., via the input device 46) causing the controller 52 to collect and store image data of the augmented reality view 60. The controller 52 may then store the image data associated with the augmented reality view 60 (Block 814) for further processing. For example, the image data may be stored (e.g., in the memory 56) and subsequently analyzed, for example, by the controller 52 or another device. The controller 52 may then transmit the image data to an off-board computer (Block 816), such as the off-board computer 54 or another device type of device via the communication device 50. This may enable data collection from multiple machines, which data can then be collected and analyzed in conjunction with efforts to better understand, predict, and/or prevent wearing of ground engaging tools. For example, collected data may be analyzed by manufacturers, dealers, and or other entities in an effort to improve ground engaging tool and/or to recommend proper ground engaging tools for certain jobs.

It will be apparent to those skilled in the art that various modifications can be made to the tool erosion detecting system of the present disclosure without departing from the scope of the disclosure. Other embodiments will be apparent to those skilled in the art from consideration of the specification and practice of the tool erosion detecting system disclosed herein. It is intended that the specification and examples be considered as exemplary only, with a true scope of the disclosure being indicated by the following claims and their equivalents.

What is claimed is:

1. A tool tip erosion detecting system for a machine having a ground engaging tool tip, comprising:
   a camera configured to generate a first image of the ground engaging tool tip on a display device;
   an input device configured to receive a user input; and
   a controller in communication with the camera and the input device and being configured to generate an augmented reality view of the ground engaging tool tip, the augmented reality view including:
   the first image of the ground engaging tool tip generated by the camera; and
   a second image of a ground engaging tool tip superimposed on the first image and being associated with a selected wear level, wherein the selected wear level is based on the user input.

2. The tool tip erosion detecting system of claim 1, wherein the first image of the ground engaging tool tip is one of a live video image and a captured still image.

3. The tool tip erosion detecting system of claim 1, wherein the superimposed second image of a ground engaging tool tip includes a graphical single-side view of a ground engaging tool tip.

4. The tool tip erosion detecting system of claim 1, wherein the superimposed second image of a ground engaging tool tip includes a graphical perspective view of a ground engaging tool tip.

5. The tool tip erosion detecting system of claim 4, wherein an orientation of the graphical perspective view of a ground engaging tool tip is adjustable via the input device.

6. The tool tip erosion detecting system of claim 1, wherein the controller is configured to generate a wear level indicator on the display device, the wear level indicator being indicative of the selected wear level.

7. The tool tip erosion detecting system of claim 6, wherein the wear level indicator is a graphical object selectively movable via the input device.

8. The tool tip erosion detecting system of claim 1, wherein the controller is configured to generate a scale on the display device, the scale being indicative of a physical dimension of the ground engaging tool tip.

9. The tool tip erosion detecting system of claim 1, wherein the controller is configured to store image data associated with the augmented reality view.

10. The tool tip erosion detecting system of claim 9, wherein:

the system further includes a communication device; and
the controller is configured to transmit the image data associated with the augmented reality view via the communication device.

11. A method of detecting tool erosion on a machine having a ground engaging tool tip, the method comprising:
generating a first image of the ground engaging tool tip, wherein the first image of the ground engaging tool tip is one of a live video image and a captured still image;
receiving a user input via an input device;
generating an augmented reality view of the ground engaging tool tip on a display device, the augmented reality view including the first image of the ground engaging tool tip; and
superimposing a second image of a ground engaging tool tip on the first image of the ground engaging tool tip, the superimposed second image being associated with a selected wear level, wherein the selected wear level is based on the user input.

12. The method of claim 11, wherein the superimposed second image of a ground engaging tool tip includes one of a graphical single-side view of a ground engaging tool tip and a graphical perspective view of a ground engaging tool tip.

13. The method of claim 12, further including adjusting an orientation of the graphical perspective view of a ground engaging tool tip in response to an input received via the input device.

14. The method of claim 11, further including generating a wear level indicator on the display device, the wear level indicator being indicative of the selected wear level.

15. The method of claim 14, further including repositioning the wear level indicator in response to an input received via the input device.

16. The method of claim 11, further including generating a scale on the display device, the scale being indicative of a physical dimension of the ground engaging tool tip.

17. The method of claim 11, further including storing image data associated with the augmented reality view.

18. The method of claim 17, further including transmitting the image data associated with the augmented reality view via a communication device to an off-board computer.

19. A tool erosion detecting system for a machine having a ground engaging tool tip, comprising:
a camera configured to generate a first image of the ground engaging tool tip on a display device;
an input device configured to receive user input; and
a controller in communication with the camera and the input device and being configured to:
generate an augmented reality view of the ground engaging tool tip, the augmented reality view including:
the first image of the ground engaging tool tip generated by the camera, the first image including one of a live video image and a captured still image of the ground engaging tool tip; and
a second image of a ground engaging tool tip superimposed on the first image and being associated with a selected wear level, wherein:
the selected wear level is based on the user input; and
the second image includes one of a graphical single-side view of a ground engaging tool tip and a graphical perspective view of a ground engaging tool tip; and
generate a wear level indicator on the display device, the wear level indicator being indicative of the selected wear level.

* * * * *